(12) United States Patent
Brookfield

(10) Patent No.: US 8,242,624 B2
(45) Date of Patent: Aug. 14, 2012

(54) ELECTRIC ACCUMULATOR UTILIZING AN ULTRA-CAPACITOR ARRAY

(75) Inventor: Chris Brookfield, Ajax (CA)

(73) Assignee: Messier-Dowty Inc, Ajax (CA)

( * ) Notice: Subject to any disclaimer, the term of this patent is extended or adjusted under 35 U.S.C. 154(b) by 0 days.

(21) Appl. No.: 12/638,485

(22) Filed: Dec. 15, 2009

(65) Prior Publication Data

US 2011/0140513 A1 Jun. 16, 2011

(51) Int. Cl.
*H02J 1/00* (2006.01)

(52) U.S. Cl. .......................... 307/9.1; 320/167
(58) Field of Classification Search .................... 307/9.1, 307/10.1; 320/167
See application file for complete search history.

(56) References Cited

U.S. PATENT DOCUMENTS

| 5,914,542 | A * | 6/1999 | Weimer et al. | 307/125 |
| 2007/0284939 | A1* | 12/2007 | Charles et al. | 303/152 |
| 2009/0206657 | A1* | 8/2009 | Vuk et al. | 307/9.1 |
| 2009/0302153 | A1* | 12/2009 | Matasso et al. | 244/99.2 |

* cited by examiner

*Primary Examiner* — Fritz M Fleming
(74) *Attorney, Agent, or Firm* — Aaron Edgar; Gowling Lafleur Henderson LLP

(57) ABSTRACT

Disclosed is an electric accumulator for selectively operating at least one aircraft device. The electric accumulator includes an ultra-capacitor array for storing electrical energy, which can later be used to power an aircraft device. The stored electrical energy can also be used as a source of emergency backup power. The distribution of the electrical energy is controlled by a power distribution controller. The electric accumulator may be charged by a power source on an aircraft, or it may be pre-charged by an external power source.

12 Claims, 7 Drawing Sheets

ELECTRIC ACCUMULATOR UTILIZING AN ULTRA-CAPACITOR ARRAY

FIELD OF THE INVENTION

This invention relates to the operation of aircraft devices, and in particular to an electric accumulator using ultra-capacitors for providing electrical power to aircraft devices.

BACKGROUND OF THE INVENTION

Many aircraft devices including brakes, steering systems and landing gear actuators, for example, have limited operation during a typical flight but have high power demands when operated. The total energy consumed by these devices during the flight is relatively low but power consumption is high.

Hydraulic systems are often used to operate such momentary-load aircraft devices. Hydraulic systems are able to distribute large amounts of power throughout the aircraft to simple devices that can easily transform hydraulic force into mechanical force. Equivalent and known electrical devices with similar power and force output are generally heavier, bulkier, and more complex and often require a gear system in order to generate the forces required.

Electrical systems could be used instead of hydraulic systems in order to operate the momentary-load aircraft devices. Electrical systems could be smaller and lighter than equivalent hydraulic systems. However, such electrical systems would have to function at relatively high voltages. This introduces other problems such as shock hazards and increased risk of arcing.

Landing gear devices including uplocks and actuators fall into the category of high power devices that are required on an intermittent basis but have low energy consumption when averaged over an aircraft flight (i.e. they are momentary-load devices). Due to safety and performance issues, landing gear must retract and extend over a short period of time.

Hydraulic accumulators have also been used on aircraft to provide emergency power, reduce peak system loads, and isolate hydraulic devices from direct interaction with other components in the system. These accumulators are placed close to the working device in order to minimize line losses, provide quick response to load demand, and reduce the probability of a line rupture between the accumulator and the device. Hydraulic accumulators have been known to be maintenance intensive, primarily due to the gas charge that is often used as the energy storage mechanism in the device.

Batteries are often used for storing energy on an aircraft. However, batteries may contain hazardous chemicals and may be disrupted by temperature changes. The weight of batteries used to store energy on an aircraft may be prohibitively heavy.

The present matter addresses at least one of the above issues.

SUMMARY OF THE INVENTION

The present matter provides an electric accumulator for selectively operating an aircraft device, comprising an ultra-capacitor for storing electrical energy, an input connector configured to couple the ultra-capacitor to a power source, an output connector configured to couple the ultra-capacitor to the aircraft device and a power distribution controller operatively connected to the ultra-capacitor, the power distribution controller for allowing electrical energy to flow through the input connection into the electric capacitor.

In one embodiment the electric accumulator includes at least one additional ultra-capacitor for storing electrical energy, the at least one additional ultra-capacitor arrayed in series with the ultra-capacitor for increasing the voltage of the electric accumulator.

In another embodiment the electric accumulator includes at least one additional ultra-capacitor for storing electrical energy, the at least one additional ultra-capacitor arrayed in parallel with the ultra-capacitor for increasing the power output of the electric accumulator.

Also provided is a method of providing power to an aircraft device, comprising: providing an electric accumulator as defined herein selectively operatively connecting the electric accumulator to a power source, directing power from the power source to the electric accumulator for storing in the ultra-capacitor of the electric accumulator, selectively operatively connecting electric accumulator to an aircraft device and directing power from the electric accumulator to the aircraft device to provide electrical energy to the aircraft device.

BRIEF DESCRIPTION OF THE DRAWINGS

A detailed description of the invention is set out below with reference to the accompanying illustrations in which.

DETAILED DESCRIPTION OF THE INVENTION

Described herein is an aircraft electric accumulator that is able to provide emergency backup power to an aircraft and to provide electrical load levelling to reduce the electrical demand on the aircraft electrical system.

The electric accumulator provides a separate source of power that may be isolated from the aircraft's main power source. Therefore, loss of electrical power from the aircraft's main power source will not compromise the power in the aircraft's electric accumulator.

The electric accumulator is operable to receive electrical power from a power source, store the power and then later distribute the power to an aircraft device when required. The aircraft device may, for example, be entirely powered by the energy stored in the electric accumulator. The power source can be located on the aircraft, or it can be on the ground and external to the aircraft for charging the aircraft's electric accumulator before the aircraft takes off.

The electric accumulator includes a means for storing electrical energy for later use by an aircraft device. The electric accumulator also includes a means for providing electrical energy for storing and for distributing electrical energy to an aircraft device. The electrical accumulator also includes a means for controlling distribution of the stored electrical energy to an aircraft device.

Figure 1:
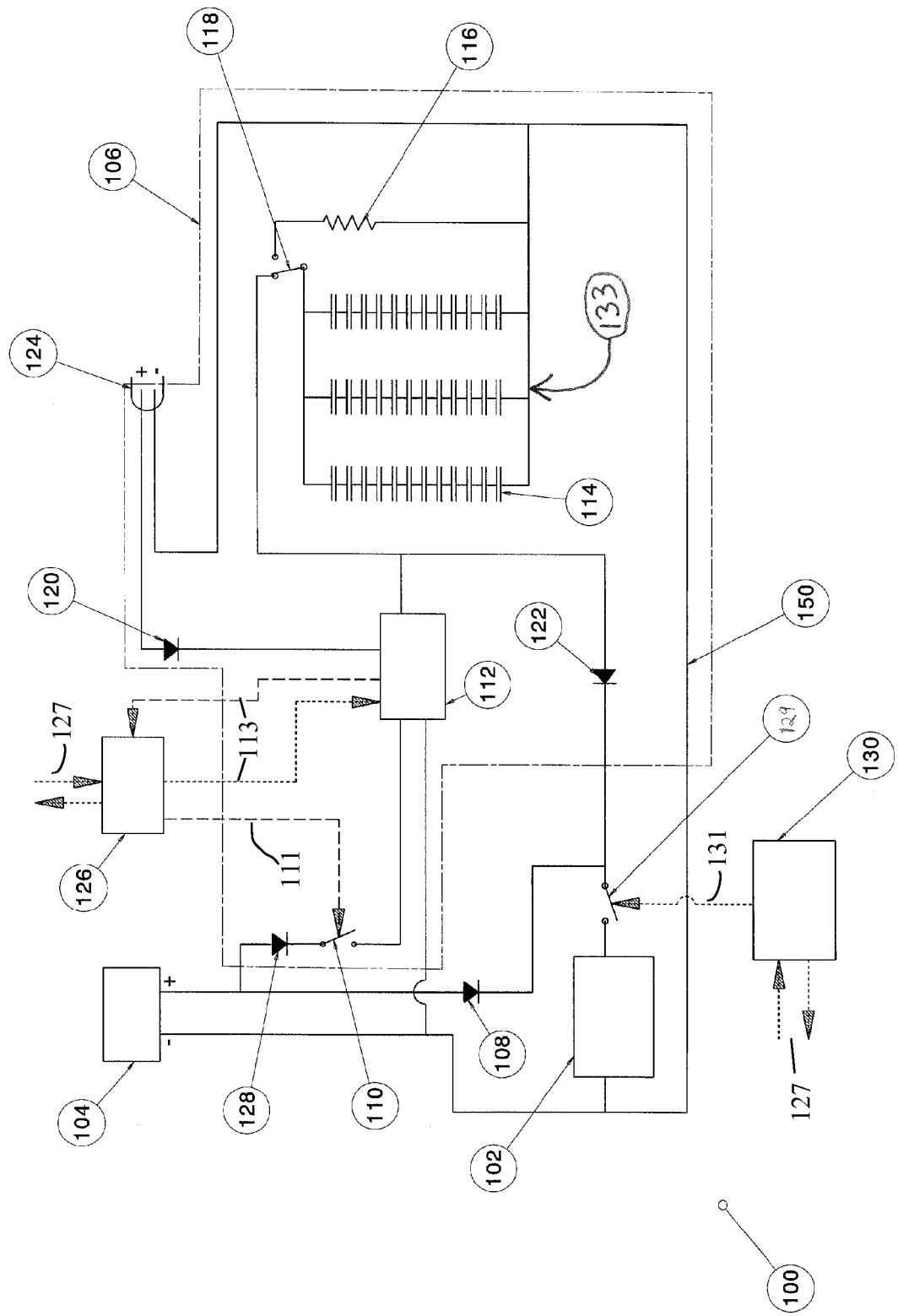
FIG. 1 shows a block diagram of one embodiment of the electric accumulator described herein with a charge control relay shown in a open position.

Referring to FIG. 1, disclosed is an electric accumulator 106 for selectively operating an aircraft device 102. In other words an aircraft device 102 can be operated intermittently or when required by the electric accumulator 106. In an exemplary embodiment, the aircraft device 102 is an electrical or electro-mechanical load device which is at least partially operable by electrical energy. For example the aircraft device 102 may be landing gear device, uplocks, an actuator for landing gear, a braking system, a steering system, etc. The electric accumulator 106 resides on an electrical circuit 150. The electrical circuit 150 may be existing as part of the aircraft circuitry, for example. The aircraft device 102 is connected to the circuit 150 as shown in FIG. 1. The aircraft device 102 may also be disconnected from the circuit 150, at which time it will not receive electrical energy through the circuit. An aircraft power distribution controller 126 as well as aircraft power 104 can also be connected to the circuit 150. Other electronic components known to a person of ordinary skill in the art may also be connected to the circuit 150.

Although the invention will be herein described with reference to a single ultra-capacitor 114 it is understood that the preferred embodiment uses an array of ultra-capacitors 133, as shown and described in detail below.

In one embodiment, shown in FIG. 1, an input connection 110 is configured to couple the ultra-capacitor 114 to a power source 104. The power source 104 may include, for example aircraft power 104. The input connection 110 may include a charge control relay 110 (as shown in the Figures). The aircraft power 104 may be connected through the circuit 150 to each of the aircraft device 102, an ultra-capacitor 114, and an ultra-capacitor charge circuit 112. The aircraft power distribution controller 126 may be connected through the circuit 150 to the ultra-capacitor charge circuit 112 and to the charge control relay 110, explained further below.

The electric accumulator 106 (shown by the dashed lines in FIG. 1) includes an ultra-capacitor 114 (or an ultra-capacitor array 133) for storing electrical energy. The ultra-capacitor array 133 comprises individual ultra-capacitors 114. An output connector 129 is configured to couple the ultra-capacitor to the aircraft device 102. In the embodiment shown in the figures the output connector 129 is a relay 129, described in more detail below. The electrical energy stored in the ultra-capacitor 114 can later be directed along the circuit 150 through the relay 129 to the aircraft device 102 in order to power the aircraft device 102.

Operating voltage of the electric accumulator 106 can be increased by connecting a number of ultra capacitors 114 in series to form an ultra-capacitor array 133. For example, typical aircraft electrical systems operate at 28 V (dc). Since commercially available ultra-capacitors 114 are only capable of 2 to 3 V (dc) potential, 12 capacitors may need to be connected in series to attain the aircraft electrical system operating voltage. However, this may increase the resistance of the ultra-capacitor array 133 resulting in reduced maximum power output. Power output as well as additional energy storage capability can be increased by placing ultra-capacitors 114 in parallel. The number of parallel rows and the capacitance of each individual ultra-capacitor 114 may be determined based on the load characteristics of the aircraft device 102 being operated. These characteristics may include, for example, power requirements, operating voltage range or duration of use.

It is known in the art that a capacitor is an electronic device that can store electrical charge. The charge is stored Q in Coulombs is related to the capacitance C in Farads and the voltage V across the capacitor in Volts by the equation Q=CV. A super- or ultra-capacitor array as referred to herein, is a capacitor array with sufficient energy storage and power delivery capability to operate electro-mechanical and/or at least partially electronic aircraft components, including but not limited to components for propulsion, flight controls, landing gear and braking systems.

As is known in the art, ultra-capacitors may use different materials, geometric structures, and manufacturing techniques such as porous carbon electric double layer capacitor. A porous carbon electric double layer capacitor consists of activated charcoal powder that forms a porous carbon structure to store the electric charge via ions of the electrolyte system (typically acetonitrile (AN) and tetraethylammonium tetrafluoroborate (TEATFB)). This type of capacitor relies on molecules in the electrolyte to act as the dielectric barrier using the Helmholtz double layer effect. Since the dielectric strength of these molecules is relatively low, the voltage potential is limited to between 2 and 3 volts. Further, the use of a liquid electrolyte may limit the operational range of the ultra-capacitor 114 since the above mentioned electrolyte can become more viscous at low temperatures and freeze at temperature below −40 degrees Celsius. Lower operating temperatures may be achieved by adding other co-solvents to the electrolyte.

There are a number of emerging technologies that may improve upon the existing electric double layer ultra-capacitor. For example, the activated carbon powder may be replaced with vertically aligned carbon-nano tubes created using vapour deposition techniques. This technology could greatly reduce the internal resistance and increase surface area per unit volume resulting in both higher power output and increased energy storage capacity.

There are also emerging ultra-capacitor technologies that could exceed the capabilities of the electric double layer ultra-capacitor and eventually displace it. For example, one technology proposes using nano-manufacturing techniques on an aluminum substrate and atomic layer deposition to create billions of "electrostatic capacitors" per square centimeter on the substrate. Anodizing of the aluminum opens up nano-pores with an aluminum oxide surface and subsequent thin layers of titanium nitride and aluminum oxide layers are deposited to create and connect the nano-capacitors into a vast array on a single substrate. The high dielectric strength of aluminum oxide permits higher operating voltages and since the device is solid state, the operational temperature range may be greatly expanded over the "porous carbon electric double layer capacitor". This technology could be readily utilized in the electric aircraft accumulator 106, described herein, and function outside the pressurized areas of the aircraft fuselage and in space based applications.

It is recognized that the "aircraft electric accumulator" could utilize any of the above capacitor technologies as well as similar capacitor technologies developed now or in the future.

An input connector 110 (a charge control relay 110 for example) is configured to couple the ultra-capacitor 114 to a power source to allow the ultra-capacitor 114 to receive electrical energy. For example, the charge control relay 110 may close to allow electricity to flow from the aircraft power 104 through the charge control relay 110 into ultra-capacitor 114 via the circuit 150 and via the ultra-capacitor charge circuit 112. By way of further example, the charge control relay 110 may open to restrict electricity from flowing to the ultra-capacitor 114 via the circuit 150 and the ultra-capacitor charge circuit 112. In other words the input connector 110 is configured to be connected to the power source, thus allowing electrical energy to flow into the ultra-capacitor 114, when power is required and disconnected when power is no longer required.

An output connector 129 is configured to couple the ultra-capacitor 114 to the aircraft device 102. The output connector 129 may, for example, be a relay 129. For example, the relay 129 may be closed thus allowing electricity to flow from the ultra-capacitor 114 to the aircraft device 102. Similarly, the relay may be open thus restricting electricity from flowing from the ultra-capacitor 114 to the aircraft device 102. In other words the output connector 129 is configured to be connected to (and allow electricity to flow to) the aircraft device 102 when power is required, such as for operating an aircraft device, and disconnected when power is no longer required. However, in the preferred embodiment the output connection remains connected to the aircraft device 102, both when power is required by the aircraft device 102 and when it is not.

Figure 2:
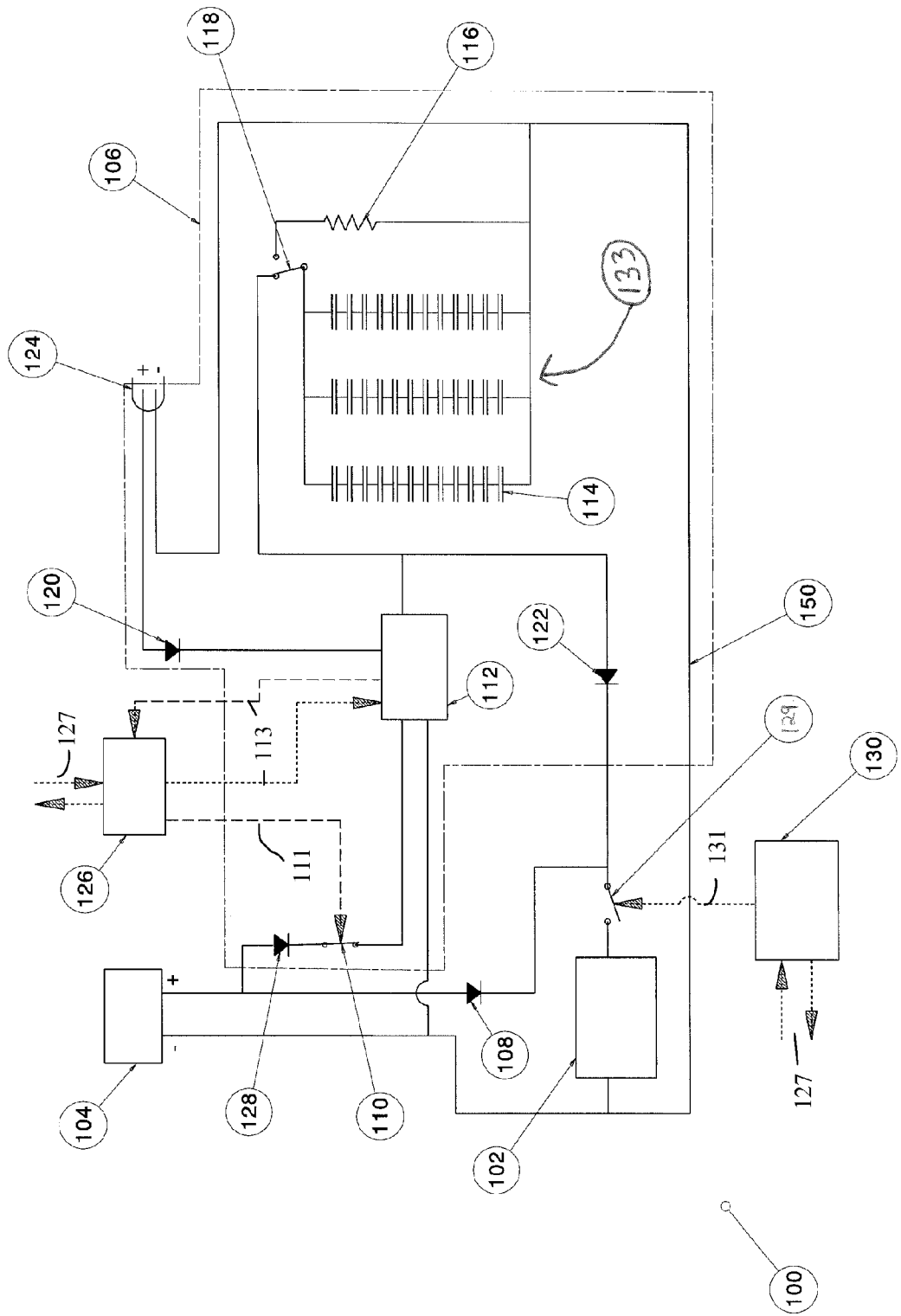
FIG. 2 shows one embodiment of the electrical accumulator with a charge control relay shown in a closed position.

Referring to FIG. 1, an accumulator input isolation diode 128 is operatively connected to the ultra-capacitor 114 for blocking electric current from flowing out of the ultra-capacitor 114 and into the aircraft power source 104. Electrical energy can flow from the aircraft electrical supply 104 along the circuit 150 through the accumulator input isolation diode 128 which also resides on the circuit 150. The accumulator input isolation diode 128 can, for example, be any type of diode suitable for use in the circuit 150 as described herein. On the output side of the diode 128, on the circuit 150, resides a charge control relay 110 for controlling the flow of electricity along the circuit 150. The accumulator input isolation diode 128 prevents electricity from flowing back towards the aircraft power source along the circuit 150 from the electric accumulator 106 when the charge control relay 110 is closed. When the charge control relay 110 is open, electricity is prevented from flowing along the circuit 150. FIG. 1 shows the charge control relay 110 as being open and FIG. 2 shows the charge control relay 110 as being closed. The charge control relay 110 is preferably a charge control solid-state relay and is controlled by the aircraft power distribution controller 126.

Additionally, the aircraft power distribution controller 126 can receive and transmit information over the aircraft data bus 127 to communicate with other aircraft systems and the main aircraft controller. The data bus may, for example, be a dual channel ARNIC 429 bus for commercial aircraft. In an alternative embodiment, the aircraft power distribution controller 126 transmit or communicate information via discreet signals. The discreet signals may, for example, be transmitted using hard wiring to other controllers or devices.

Referring still to FIG. 1, the aircraft power distribution controller 126 communicates via control signals 113 with the ultra-capacitor charge circuit 112 for regulating or controlling the amount of electrical power used or consumed from the aircraft power supply 104. Thus, if power demand is high from other aircraft systems, the aircraft power distribution controller 126 can reduce the amount of electrical power flowing to the ultra-capacitor charge circuit 112. Additionally, the aircraft power distribution controller 126 can totally isolate the electric accumulator 106 from the aircraft power supply 104 by switching charge control relay 110, via control signal 111, to the open position so that the electric accumulator 106 consumes or uses none of the aircraft power supply 104

The aircraft power distribution controller 126 also resides on the circuit 150 and is operatively connected to the charge control relay 110. In other words the aircraft power distribution controller 126 can open and close the charge control relay 110, and thereby control the energy flow and distribution along the circuit 150, and in particular, into and out of the electric accumulator 106. The aircraft power distribution controller 126 may, for example, determine when the electric accumulator 106 may be charged. For example, sensors (not shown) on the aircraft may detect that the electrical demand for the aircraft generally is low. The aircraft power distribution controller 126 may then determine that it is therefore an appropriate time to charge the electric accumulator 106 using excess electrical energy from the aircraft's general electrical supply 104 for example. To do so the aircraft power distribution controller 126 closes the charge control relay 110 to allow electrical energy to flow into the ultra-capacitors from the power source (which in this example is the aircraft's electrical supply).

The aircraft power distribution controller 126 may, for example, be automated to automatically open and close the charge control relay 110 when appropriate (e.g. when the ultra-capacitor array 133 has capacity and when adequate electrical energy can be redirected from the power source). Alternatively, the charge control relay 110 may remain closed in order to maintain full charge levels in the ultra-capacitor 114.

The electric aircraft accumulator 106 includes an ultra-capacitor charge circuit 112. The ultra-capacitor charge circuit 112 can for example be a single resistor or a more complex arrangement consisting of a constant-current power supply or other controlled charging circuit that would be known to a person of ordinary skill in the art. The ultra-capacitor charge circuit 112 is connected to the aircraft power supply 104 via the circuit 150.

The circuit 150 may be fabricated out of wire or other suitable conductive material.

The ultra-capacitors 114 may use carbon foam structure to increase the surface area available for storage of electrical charge, as would be familiar to a person of ordinary skill in the art. Individual capacitors may have a capacitance in the range of 3000 Farads with 11000 Joules of energy storage, 7590 watts of maximum power output with a mass of 0.55 kg, for example. When electrical energy flows into the ultra-capacitors 114, the ultra-capacitors 114 store electrical energy (i.e. charge) for later use virtually instantaneously with no detrimental effects. Ultra-capacitors 114 operate at relatively low voltages (for example 2.5 volts) but, as described below, can be arrayed in series to increase the voltage and arrayed in parallel to increase the power output.

As stated above, the electric accumulator 106 may comprise a plurality of ultra-capacitors 114 to increase the energy storage capacity and obtain the desired electrical characteristics. For example, three parallel columns of twelve series connected ultra-capacitors 114 may be connected in an array on the circuit 150 as shown in FIG. 1. This forms an ultra-capacitor array 133, shown in FIG. 3, containing thirty six ultra-capacitors 114. Ultra-capacitors 114 are arrayed in series on the circuit 150 to increase the voltage and in parallel to increase the power output capability of the electric accumulator 106.

In an alternative embodiment the power source is an external power supply (not shown). The ultra-capacitor 114 receives electrical energy through, and is thereby charged through, an external receptacle 124. The external receptacle 124 is a receiver into which the external power supply can be operatively connected. When operatively connected to the external receptacle 124, electrical energy can flow from the external power supply to the ultra-capacitor 114. The ultra-capacitor 114 stores the electrical energy for later use or discharge.

As shown in FIG. 1, electrical power entering through the external receptacle 124 is monitored and controlled by the ultra-capacitor charge circuit 112.

The external power supply can be temporarily operatively connected to the external receptacle 124. The ultra-capacitor 114 will only receive and store electrical power for the duration of time that the external power supply is operatively connected to the external receptacle 124, and electrical energy is flowing from the external power supply through the external receptacle 124 to the ultra-capacitor 114.

In another embodiment, the electrical power for charging the electric aircraft accumulator may come from a second aircraft power supply.

In another embodiment, a second power supply is operatively connected to the electric accumulator 106 (e.g. via the circuit 150) in order to supply electrical energy to the ultra-capacitors 114 in the electric accumulator 106. Each of the power supply sources may be independently operated by the aircraft power distribution controller 126 (as described below) and may therefore independently provide electricity to the electric accumulator 106. It is recognized that there may, similarly, be additional power supplies connected to the electric accumulator 106 via the circuit 150.

A maintenance discharge resistor 116 and maintenance discharge switch 118 reside on the circuit 150 and may be used in order to discharge the electric accumulator 106 by dissipating stored electrical energy from the ultra-capacitor 114.

In more detail, the maintenance discharge switch 118 can be in one of two position, "arm" or "disarm". When in the arm position (as shown in FIG. 1), the circuit 150 is connected to the ultra-capacitor 114 thereby allowing electricity to flow to the ultra-capacitor 114. When in the disarm position (not shown) the ultra-capacitor 114 is fully disconnected from the charging circuit 150 so that electricity cannot flow between the circuit and the ultra-capacitor 114. In the disarm position the maintenance discharge resistor 116 dissipates electricity from the ultra-capacitor 114. This may provide additional safety for example.

Optionally a back flow prevention diode 120 can be included in the circuit 150 on the output side of the external receptacle 124. The back flow prevention diode 120 prevents accidental discharge through the external receptacle 124. Additionally the back flow prevention diode 120 prevents reverse polarity charging.

An accumulator output isolation diode 108 resides on the output portion of the electric accumulator 106. The accumulator output isolation diode 108 thereby prevents the electrical flow from the output side of the electric accumulator 106 from flowing back into the aircraft electrical system.

Similarly a back flow prevention diode 122 resides on the output portion of the electric accumulator 106. The back flow prevention diode 122 prevents flow from the aircraft electrical system from flowing into the output side of the electrical accumulator 106.

The fabrication and structure of diodes are familiar to those of ordinary skill in the relevant art. Similarly, the function of the diodes in the presently disclosed invention will be understood to those skilled in the art. For example, the diode could be a typical p-n semi-conductor junction diode commonly available for power applications (such as rectifiers) or a specialized semi-conductor diode to improve efficiency. One alternative may be the Super Barrier diode which has similar surge-handling capability and low reverse leakage current of a normal p-n junction diode but lower forward voltage drop.

Figure 3:
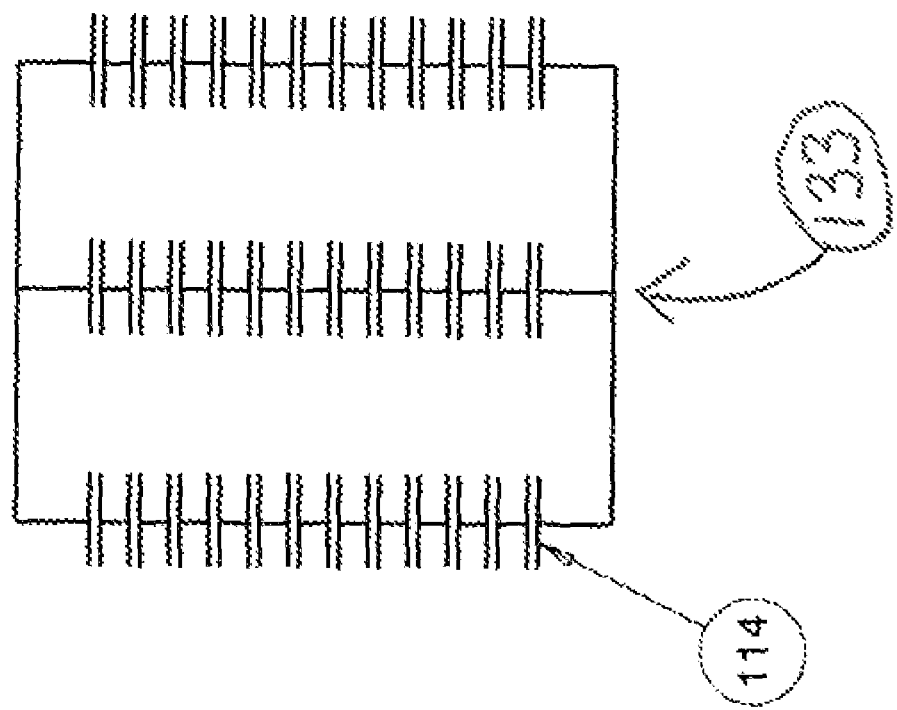
FIG. 3 shows another embodiment of the electrical accumulator with ultra-capacitors arrayed in a series and parallel array.

Referring to FIG. 3, the ultra-capacitors 114 may be in a series-parallel array. Ultra-capacitors 114 may only be capable of a voltage potential of 2 to 3 volts. Having the ultra-capacitors 114 in series may a achieve a 28 volt working potential.

FIG. 3 shows the ultra-capacitor array 133 in isolation. There are three parallel columns of ultra-capacitors 114 with each column having a series of twelve ultra-capacitors 114. Additional parallel columns of ultra-capacitors 114 may be added to the circuit 150 to increase the power output capability. The number of series connected ultra-capacitors 114 in the columns can be increased to increase the working voltage potential. Such properties of ultra-capacitors arrays are known to those skilled in the art.

The aircraft device 102 may be an electrical device or an electro-mechanical device. For example, the aircraft device 102 may be a landing gear device such as an actuator for controlling the descent and ascent of the landing gear; the aircraft device 102 may be an uplock for securing the landing gear in the ascended position; the aircraft device 102 may be a steering system for the aircraft or an electro-mechanical component of a steering system; or the aircraft device 102 may be a braking system of an aircraft or an electro-mechanical component of a braking system. The aircraft device 102 may be other electro-mechanical or electrically operated devices familiar to a person of ordinary skill in the art. The aircraft device 102 may, for example, be any momentary-load device used on an aircraft.

Figure 4:
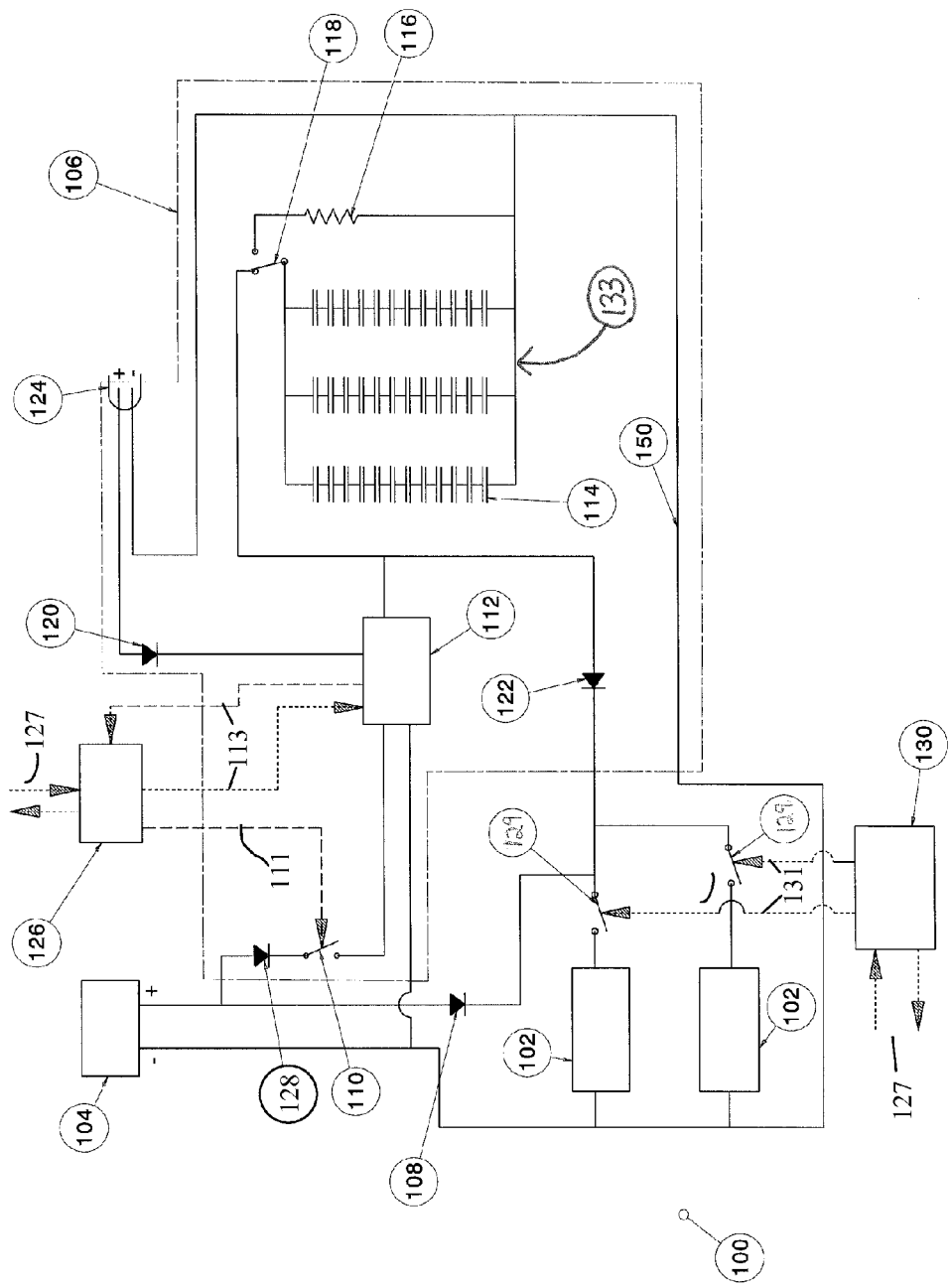
FIG. 4 shows a further embodiment of the electrical accumulator operatively attached to two aircraft devices.

In an alternative embodiment, shown in FIG. 4 two aircraft devices 102 are operatively attached to the circuit 150. Each aircraft device 102 is attached in parallel on the circuit 150. Each of the aircraft devices 102 is operatively connected to the electric accumulator 106 via the circuit 150. The ultra-capacitor 114 of the electric accumulator 106 provides stored electrical energy to each of the two aircraft devices 102 for powering the aircraft devices 102.

It is recognized that additional aircraft devices 102 may be similarly connected to a single electric accumulator 106 in a similar manner as in the above described circuit 150.

The sub-system controller 130 is operatively connected to each of the two aircraft devices 102 so that the sub-system controller 130 independently controls electricity distribution to the two aircraft devices 102.

The aircraft device 102 may be configured to connect to or disconnect from the circuit 150 by a relay 129 (see FIG. 1) that in turn is operated by a sub-system-controller 130, via control signal 131. This sub-system-controller 130 is responsible for control of a particular aircraft sub-system (e.g. the landing gear system). This sub-system-controller 130 is also connected to the aircraft data bus 127 and can communicate to other system controllers and the aircraft central controller. Thus, central logic or software built into the aircraft central controller can receive data regarding charge status of the electric accumulator 106 from the aircraft power distribution controller 126 and send a signal to the sub-system-controller 130 indicating that sufficient power is available to operate the aircraft device 102.

The aircraft power distribution controller 126 may contain a computer processor (CPU) and communicate (send and receive data) with the aircraft central controller (computer), other sub-system controllers such as sub-system controller 130, and the ultra-capacitor charge control circuit 112 via a data bus (such as ARNIC 429) or hard wiring. The aircraft power distribution controller 126 may also contain memory. Memory may be programmed with instructions, executable by the processor based on input data received through the data bus or hard wiring. Upon executing the instructions, the processor (CPU) controls and instructs the aircraft power distribution controller 126 to operate the charge control relay 110 in order to allow electrical energy to flow into the electric accumulator 106 to charge the ultra-capacitor 114. Similarly, instructions (i.e. computer code) may be stored in memory such that the instructions are executed by the processor in order to provide an output signal to the ultra-capacitor charge control circuit 112 to control the flow rate of electricity to the ultra-capacitors 114.

The aircraft power distribution controller 126 may, additionally, receive as input the accumulator charge status indicating the level of electrical energy present in the electric accumulator 106. In one embodiment, the processor in the aircraft power distribution controller 126 receives the accumulator charge status from charge control circuit 112 and automatically (according to instructions stored on memory) operates the charge control relay 110 in order to provide more electrical energy to the ultra-capacitor 114 in the electric accumulator 106. The operation of the charge control relay 110 may be controlled by an output signal sent from the aircraft distribution controller to the charge control relay 110. For example, if the accumulator charge status indicates that there is capacity for further electrical energy in the ultra-capacitor 114 then the aircraft power distribution controller 126 may send an output signal, also referred to as the accumulator charge command, to the charge control relay 110 so that the charge control relay closes to allow electrical energy to flow from the power source to the ultra-capacitor 114. Further, the processor (CPU) in the aircraft distribution controller 126, may send an output signal via the data bus (such as ARNIC 429) or hard wiring to other sub-system controllers such as 130 or the aircraft central controller (computer) indicating the accumulator charge status.

A user interface (for example a switch controlling the landing gear ascent/descent) may be connected to a processor (CPU) in the sub-system controller 130. The user interface may allow a user to enter a command that will execute certain stored instructions on the processor. Such instructions may be stored or programmed into memory. When acceptable input signals are received, for example an acceptable accumulator charge status signal is received from aircraft distribution controller 126, instructions are executed by the processor (CPU) in sub-system controller 130 to close the device on/off relay 129 allowing the aircraft device 102 to receive electrical energy from the electric accumulator 106 and operate. For example, when the processor executes certain instructions from memory as requested by a user through the user interface the aircraft power distribution controller 126 may direct electrical energy from the electric accumulator to the landing gear actuator (an example of an aircraft device 102) so that the landing gear descends.

In another embodiment, the accumulator output isolation diode 108 could be eliminated to allow the electric accumulator 106 output to feed directly into the aircraft power system, thus providing back-up power for the entire system.

The sub-system controller 130 may independently operate each of the aircraft devices 102 attached to the circuit 150. In other words the sub-system controller 130 may allow electrical energy to flow from the electric accumulator 106 to one of the aircraft devices 102 but not the other aircraft devices 102, and vice versa.

It is recognized that the power provided by the ultra-capacitors 114 in the electric accumulator 106 may be above the power delivery capability of the aircraft's normal power supplies. This allows for smaller and lighter aircraft generators since peak output power of these generators can be reduced using the electric accumulator 106. This also results in reduced load on the aircraft engines to power the generators. Since the electric accumulator 106 can be located close to the aircraft device 102, the aircraft electrical wiring between the generators and the aircraft device 102 can be reduced in size due to the lower current flow requirements. The net result may be better aircraft performance and lower fuel consumption.

Using the herein disclosed electric accumulator 106, the aircraft delivery system voltage can be increased above the conventional 28 Voltage DC.

It is recognized that the electric accumulator 106 as disclosed could also be used for emergency power or power smoothing for example.

Figure 5:
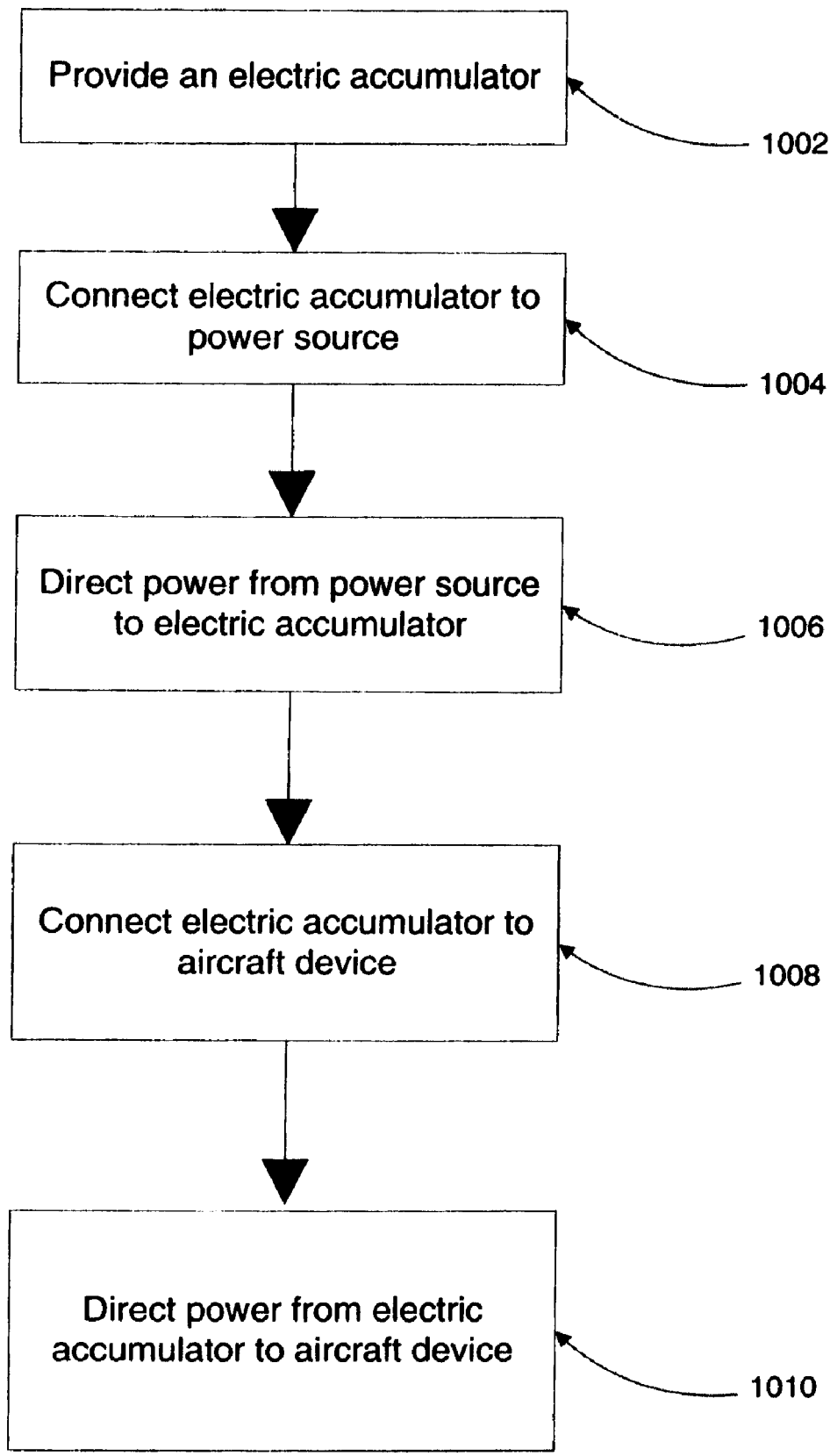
FIG. 5 is a flow chart showing a method of providing electrical energy to an aircraft device.

FIG. 5 is a flow chart of a method of providing power to an aircraft device 102. At step 1002 an electric accumulator 106 (as described above) is provided. At step 1004 the electric accumulator 106 is connected or coupled to a power source. For example, the charge control relay 110 may be closed to allow electricity to flow to the ultra-capacitor 114 via the circuit 150. At step 1006 electrical power is directed from the power source to the electric accumulator 106. At step 1008 the electric accumulator 106 is connected or coupled to an aircraft device 102. For example, the relay 129 may be closed.

The step 1008 of connecting the electric accumulator 106 to the aircraft device 102 can be undertaken before the step 1006 of directing power from a power source to the electric accumulator 106. Similarly the step 1008 of connecting the electric accumulator 106 to the aircraft device 102 can be undertaken before the step 1004 of connecting the electric accumulator 106 to the power source. Finally, at step 1010, electric power is directed from the electric accumulator 106 to the aircraft device 102.

Preferably, the electric accumulator 106 is mounted near the aircraft device 102 in order to increase the efficiency of the emergency power backup and load levelling capabilities of the electric accumulator 106. For example, if the aircraft device is an electric brake or an electric steering system, the electric accumulator 106 could be mounted on the landing gear leg or in the landing gear bay.

Figure 6:
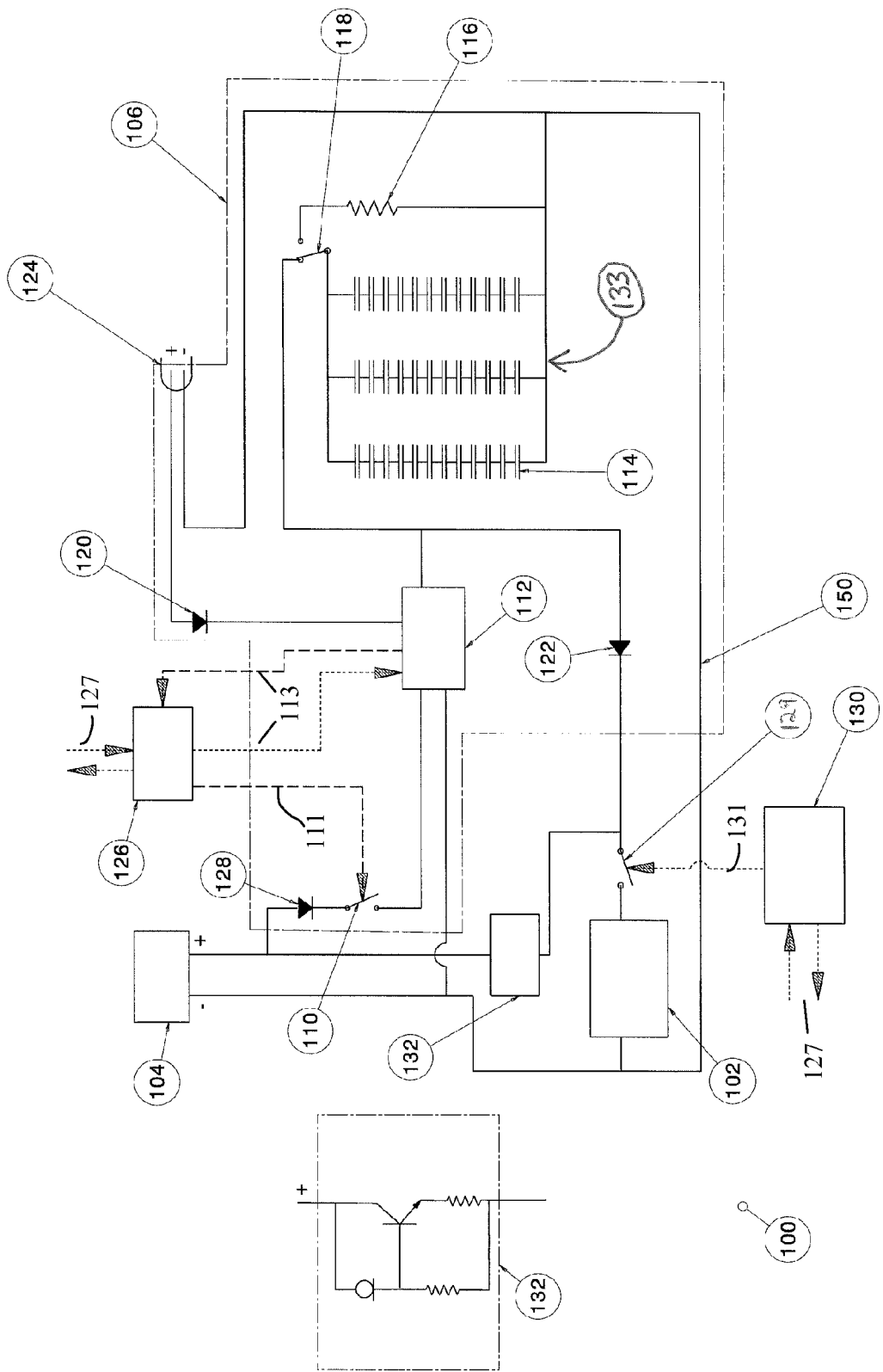
FIG. 6 shows another embodiment of the electrical accumulator with an active current limiting circuit.

In an embodiment (shown in FIG. 6) the accumulator output isolation diode 108 is replaced with an active current limiting circuit 132. In such a design, the current flow from the aircraft power source 104 is limited to a set value with the remainder of the required power for the aircraft device 102 coming from the ultra-capacitors 114. This modification is analogous to a restrictive flow device in a hydraulic circuit. The aircraft device 102 may be able to derive all of its power from aircraft power source 104 during low load operation, however, when high loads are encountered by the aircraft device 102, the power will preferentially flow from the electric accumulator 106. This arrangement protects the aircraft power source 104 from being overloaded at peak power demand but still allows the aircraft device 102 to operate at high power levels on an intermittent basis.

Figure 7:
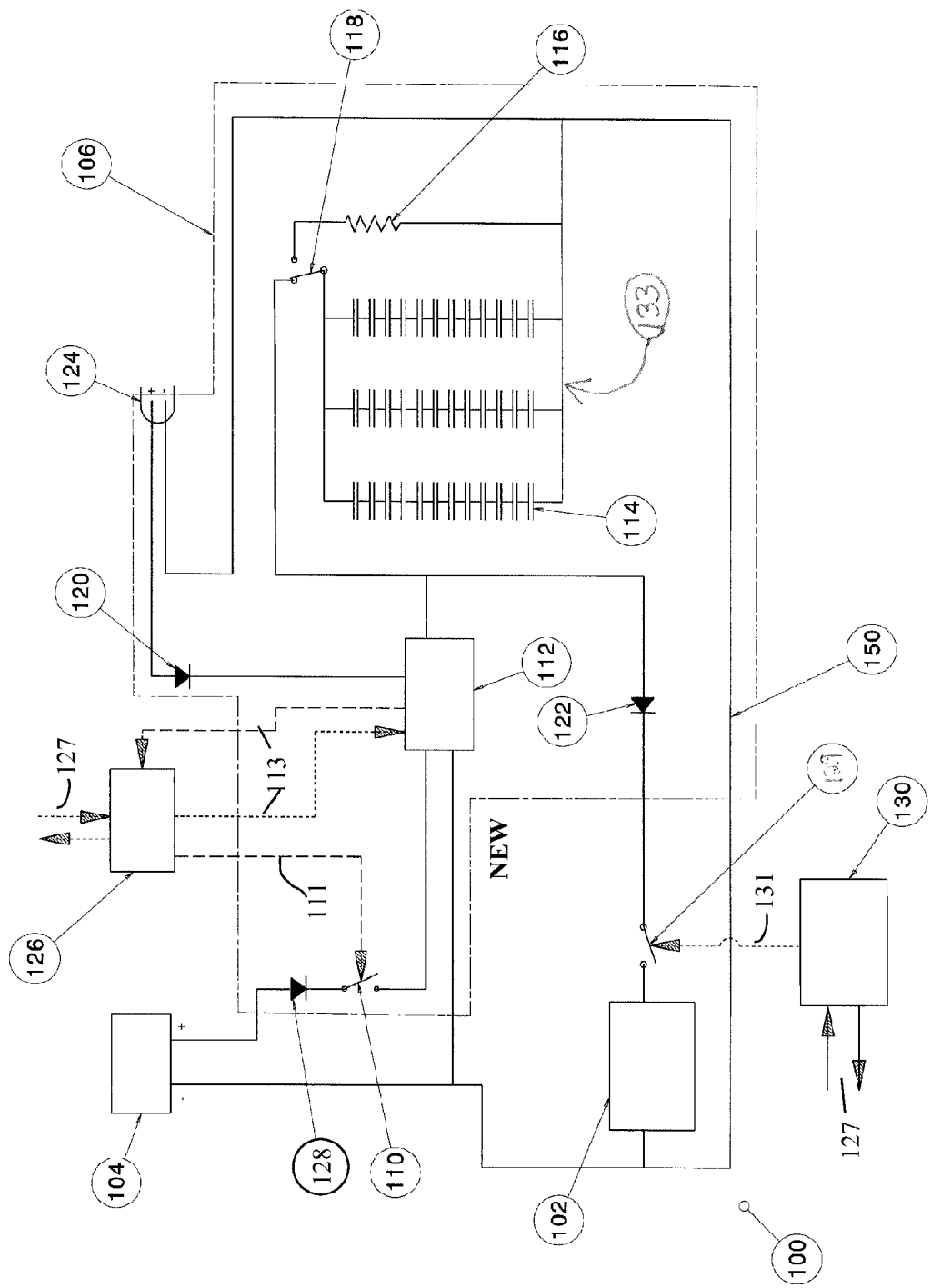
FIG. 7 shows another embodiment of the electrical accumulator attached to an isolated aircraft device.

A further alternative embodiment, which will now be described, is shown in FIG. 7. The aircraft device 102 cannot receive any power directly from the aircraft power source 104. This may be beneficial when the aircraft device 102 has the characteristic of operating at very high power levels for short duration bursts. In such an application, the aircraft power source 104 may be incapable of operating the aircraft device 102 or adding any significant power to aid in its operation. Such aircraft devices 102 may, for example, include high power linear motors or lasers. The aircraft power source 104 is capable of slowly charging the electric accumulator 106 until an acceptable level of energy is stored in the accumulator 106 for the aircraft device 102 to operate. Once the aircraft device 102 is operated and energy in the electric accumulator 106 is depleted, the aircraft power source 104 can slowly charge the accumulator 106 once again.

The ultra-capacitors 114 preferably operate in areas where the temperatures range from −40 degrees Celsius and 70 degrees Celsius, such as in the pressurized areas of the aircraft.

In an embodiment, using the porous carbon electric double layer capacitor, by adding co-solvents to the electrolyte to improve low temperature viscosity and lower the freezing point. By lowering the operational temperature, they could the capacitors could potentially be used in unpressurized areas of the aircraft where operational temperature requirements are typically −54 degrees Celsius. In such an embodiment the electric accumulator 106 could be located closer to certain aircraft devices 102 such as landing gear.

Although specific embodiments of the invention have been described herein, it will be understood by those skilled in the art that variations may be made thereto without departing from the spirit of the invention or the scope of the appended claims.

What is claimed is the following:

1. An electric accumulator for selectively operating an aircraft device, comprising:
   an ultra-capacitor for storing electrical energy;
   an input connector configured to couple the ultra-capacitor to a power source;
   an output connector configured to couple both the ultra-capacitor and the power source to the aircraft device; and
   a power distribution controller operatively connected to the input connector and the output connector for controlling the flow of electrical energy to and from the ultra-capacitor, the power distribution controller configured to:
   determine power demand on the power source;
   selectively close the input connector to charge the ultra-capacitor by allowing electrical energy to flow into the ultra-capacitor if the power demand is low;
   selectively open the input connector to restrict electrical energy from flowing into the ultra-capacitor if the power demand is high; and
   selectively close the output connector to power the aircraft device using the electrical energy from both the ultra-capacitor and the power source by allowing it to flow to the aircraft device.

2. The electric accumulator of claim 1 further comprising at least one additional ultra-capacitor for storing electrical energy, the at least one additional ultra-capacitor arrayed in series with the ultra-capacitor for increasing the voltage of the electric accumulator.

3. The electric accumulator of claim 1 further comprising at least one additional ultra-capacitor for storing electrical energy, the at least one additional ultra-capacitor arrayed in parallel with the ultra-capacitor for increasing the power output of the electric accumulator.

4. The electric accumulator of claim 1 wherein the aircraft device is an electrical or electro-mechanical load device which is at least partially operable by electrical energy.

5. The electric accumulator of claim 1 wherein the aircraft device is selected from the group consisting of a landing gear device, an uplock, a landing gear actuator, a steering system and a braking system.

6. The electric accumulator of claim 1, further comprising at least one second aircraft device, the at least one second aircraft device connected to the ultra-capacitor, the ultra-capacitor providing stored electrical energy to the at least one second aircraft device for powering the aircraft device.

7. The electric accumulator of claim 1 wherein the power source is the aircraft electrical supply.

8. The electric accumulator of claim 1 wherein the power source is an external power supply.

9. The electric accumulator of claim 1 wherein the aircraft device receives all of its required power from the electric accumulator.

10. The electric accumulator of claim 1 further comprising a diode operatively connected to the ultra-capacitor, the diode for blocking electric current from flowing from the ultra-capacitor to the power source.

11. The electric accumulator of claim 1 further comprising a second diode operatively connected to the ultra-capacitor, the second diode for blocking electric current from flowing into the ultra-capacitor from the output connection.

12. The electric accumulator of claim 10, the power distribution controller for selectively allowing electrical energy to flow back into the power supply.

* * * * *